Figure 1:
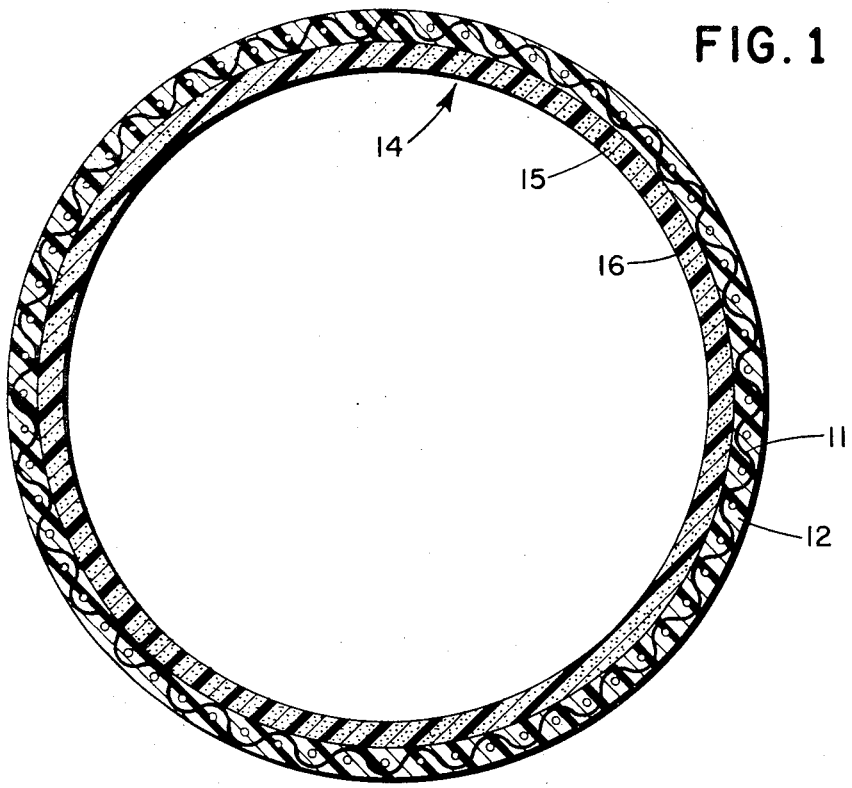

United States Patent [19]
Woodson

[11] 3,718,161
[45] Feb. 27, 1973

[54] CRACK-RESISTANT PIPE

[75] Inventor: Charles S. Woodson, Parkersburg, W. Va.

[73] Assignee: The Youngstown Sheet and Tube Company, Youngstown, Ohio

[22] Filed: June 23, 1971

[21] Appl. No.: 156,036

Related U.S. Application Data

[63] Continuation of Ser. No. 815,196, April 10, 1969.

[52] U.S. Cl..................................138/153, 138/140
[51] Int. Cl..............................................F16l 9/14
[58] Field of Search....138/DIG. 2, DIG. 7, 137, 140, 138/153, 174, 177, 178

[56] References Cited

UNITED STATES PATENTS

| | | | |
|---|---|---|---|
| 2,873,226 | 2/1959 | Davies | 138/DIG. 2 |
| 3,338,271 | 8/1967 | Plummer | 138/174 |
| 3,406,724 | 10/1968 | Carlstrom | 138/137 |

*Primary Examiner*—Herbert F. Ross
*Attorney*—J. Vincent Martin, Joe E. Edwards and M. H. Gay

[57] ABSTRACT

This patent discloses a plastic pipe and method of making same, having an outer shell of reinforced thermo-setting resin and an inner shell of thermo-setting and thermo-plastic resins.

2 Claims, 2 Drawing Figures

PATENTED FEB 27 1973  3,718,161

CRACK-RESISTANT PIPE

This is a continuation of application Ser. No. 815,196, filed Apr. 10, 1969.

This invention relates to reinforced plastic pipe, and more particularly to a plastic pipe with a high resistance to cracking.

It is conventional to centrifugally cast a thermosetting resin pipe reinforced with fibers such as fiberglas. In the casting process, a fiberglas mat and the resin are spun in a mold at high speed. Centrifugal force positions the fiberglas in the outer shell of the pipe. The inner shell is substantially pure resin.

During the curing process the resin-rich inner shell shrinks and stresses are set up in the inner shell. When the pipe is subjected to mechanical or thermal shock, cracks may occur in the inner shell due to the locked in stresses. The outer shell does not usually crack due to the reinforcing material providing a substantial volume of the outer shell.

It has been proposed in U.S. Pat. No. 2,887,728 to centrifugally cast pipe using thermosetting and thermoplastic resins of different specific gravity so that in casting the thermoplastic material is predominantly accumulated on the inner wall of the pipe. As the fiberglas is in the outer section of the pipe wall, there results a layer of thermo-setting resin between the fiberglas and thermo-plastic liner. This intermediate layer is stressed during curing of the pipe and may crack when subjected to mechanical or thermal shock. As the thermo-plastic resin is relatively low in strength, cracks in the intermediate layer will result in cracks in the thermo-plastic liner.

This invention provides a pipe in which the thermo-plastic material is dispersed throughout the entire inner shell of the pipe from the reinforcing fiber boundary to the inner wall of the pipe. Thus, there is no area of pure thermo-setting resin and the locked-in stresses due to shrinkage during curing are substantially eliminated.

An object of this invention is to substantially eliminate locked-in stresses in the inner shell of a reinforced thermo-setting resin pipe.

Another object is to provide a reinforced thermo-setting resin pipe which is much less susceptible to cracking than previously known thermo-setting resin pipe.

FIG. 1. shows in cross-section the inner and outer shells of the pipe.

Figure 2:
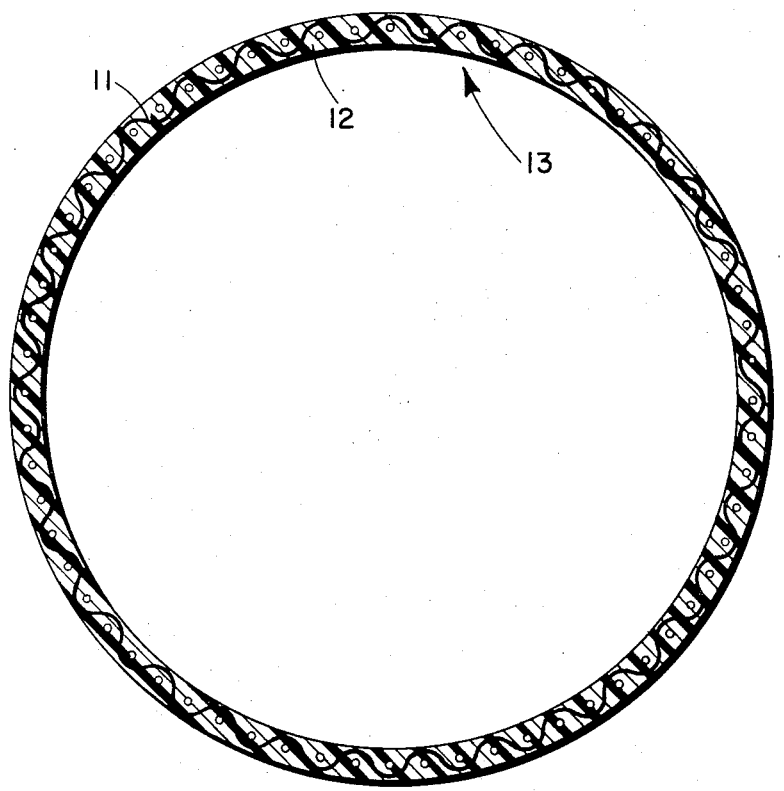

FIG. 2 shows in cross-section the outer shell of the pipe.

In practicing the method of this invention, any conventional centrifugal casting pipe mold may be used. A cylinder of reinforcing material 11, such as a mat of fiberglas, is placed in the mold. The mold is charged with just enough thermo-setting resin 12 to cover the reinforcing material 11. Preferably while the innermost fibers are coated with resin 12, they are exposed from the matrix of resin to insure the absence of a layer of pure thermo-setting resin. "Cover" as used herein is meant to include a matrix in which the reinforcing material lies just below the inner diameter surface of the matrix, or in which the innermost fibers of reinforcing material are exposed or lie on the surface of the matrix. Of course, an excessive amount of reinforcing material could be exposed, but this would result in an increased wall thickness for a comparable pipe, and thus is not desired.

The mold is spun and preferably heat is applied to form the outer shell 13 of the pipe.

In preparing the material for the inner shell 14 of the pipe, the thermo-plastic powder 15 is thoroughly mixed in the liquid thermo-setting material 16. For best results, a powder finer than 35 mesh (approximately 500 microns) is utilized. Larger material could be used, but as the particle size increases the inner surface of the pipe will be roughened. A smooth surface is desired, and therefore the finer powder should be utilized.

The percentage by volume of thermo-plastic resin 15 should be at least 15 percent of the mixture to obtain the desired relief of stresses to the extent that a significant reduction in susceptibility to cracking will result. The upper limit is theoretically about 50 to 60 percent. Preferably, 25 percent by volume thermo-plastic resin 15 is used, as this results in a pipe in which the inner shell 14 is substantially free of locked-in stresses which are significant enough to cause cracking when the pipe is subjected to normally expected mechanical or thermal shock. Greater percentages of thermo-plastic resin 15 could be used, but the dispersion becomes pasty and difficult to spread in the pipe when greater than about 35% thermo-plastic resin 15 is used.

The dispersion of thermo-plastic and thermo-setting resins 15 and 16 are charged into the previously formed outer shell 13 of the pipe. The pipe is rotated slowly to spread the dispersion evenly throughout the outer pipe shell 13 without separating the dispersion. The pipe may be rotated in the mold or it may be removed from the mold and rotated by other means. If the two resins 15 and 16 have the same specific gravity, the rotational speed of the pipe is not significant as the dispersion will not tend to separate. By rotating the pipe slowly, thermo-plastics of any desired density may be utilized.

The pipe is rotated until the inner shell 14 is formed. The thus formed pipe may be further processed to provide end fittings, etc., if desired.

Other than being formed with two charges of resin with slow rotation for the second charge, the pipe is formed using conventional procedures.

The thermo-setting resins 12 and 16 used may be any of those well known to plastic chemists. A vinyl ester, such as "Derakane", a product of Dow Chemical Company, is preferred. Other resins may be used, such as "Epocryl", a product of Shell Chemical Company. A polyester such as "Atlac 382", a product of Atlas Chemical Company, or an isophthalic polyester resin, as manufactured by Cook Paint & Varnish Company, may be used.

The pipe may be reinforced with any desired material such as fiberglas, which is preferred. The powdered thermo-plastic resin used may be any of those well known to plastic chemists. A powered polyethylene, such as "Microthene USI 708," a product of USI Chemical Co., is preferred. Other resins may be used, such as polypropylene, teflon, polyvinyl chloride, or nylon.

The thermo-setting resin may be cured with any desired catalyst, such as "USP 245", a product of U.S. Peroxygen Corporation.

Example

As an example of pipe formed in accordance with this invention, the outer shell 13 may be formed of fiberglas reinforcing mat in a matrix of "Derakane" thermo-setting resin. The inner shell 14 may be formed of 25 percent by volume thermo-plastic material of "USI708" dispersed in "Derakane." The thermo-setting resin may be cured with "USP 245". A pipe of this composition formed in the manner herein defined has been found free of cracks in its inner shell 14 when subjected to mechanical and thermal shocks normally expected in commercial use of pipe of this character.

The foregoing disclosure and description of the invention are illustrative and explanatory thereof and various changes in the size, shape and materials and method of construction, may be made within the scope of the appended claims without departing from the spirit of the invention.

What is claimed is:

1. A rotatably cast reinforced plastic pipe comprising:

an outer shell of thermo-setting resin reinforced with fibrous material throughout the entire outer shell;
   and an inner shell of thermo-setting resin with a thermo-plastic resin in powder form dispersed throughout the thermo-setting resin of the inner shell;

said thermo-plastic resin provides at least 15 percent by volume of said inner shell and being thoroughly mixed therein such that the areas of thermo-setting plastic between particles of thermo-plastic resin are uniformally minimized and small enough that stresses are reduced to the extent that a significant reduction in susceptibility to cracking results.

2. The pipe of claim 1 wherein the fibrous material is fiberglass, the thermo-setting resin is a vinyl ester, the thermo-plastic resin is polyethylene at least as small as 35 mesh and said thermo-plastic resin provides approximately 25 percent by volume of said inner shell;

there being no areas between particles of thermo-plastic material large enough to result in locked-in stresses which are significant enough to cause cracking when the pipe is subjected to normal usage.

* * * * *